Jan. 31, 1956    E. H. T. BENSEMANN    2,732,553
SELECTIVE NAIL FEED MECHANISM
Original Filed March 5, 1948    7 Sheets-Sheet 1

INVENTOR
E. H. T. BENSEMANN
By Young, Emery & Thompson
Attys.

Jan. 31, 1956  E. H. T. BENSEMANN  2,732,553
SELECTIVE NAIL FEED MECHANISM
Original Filed March 5, 1948  7 Sheets-Sheet 2

INVENTOR
E. H. T. BENSEMANN
By Young, Emery & Thompson
Attys.

Jan. 31, 1956  E. H. T. BENSEMANN  2,732,553
SELECTIVE NAIL FEED MECHANISM
Original Filed March 5, 1948   7 Sheets-Sheet 3
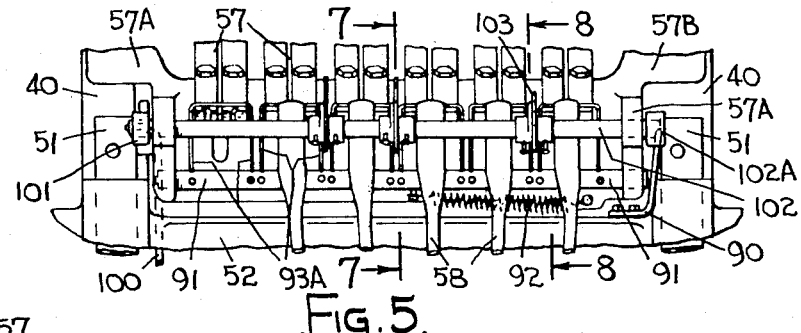
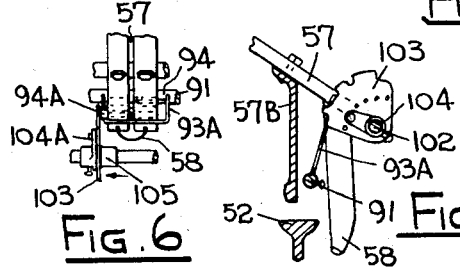
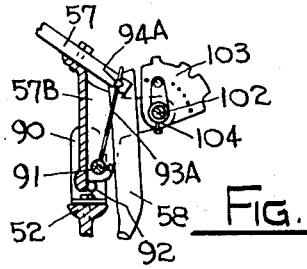
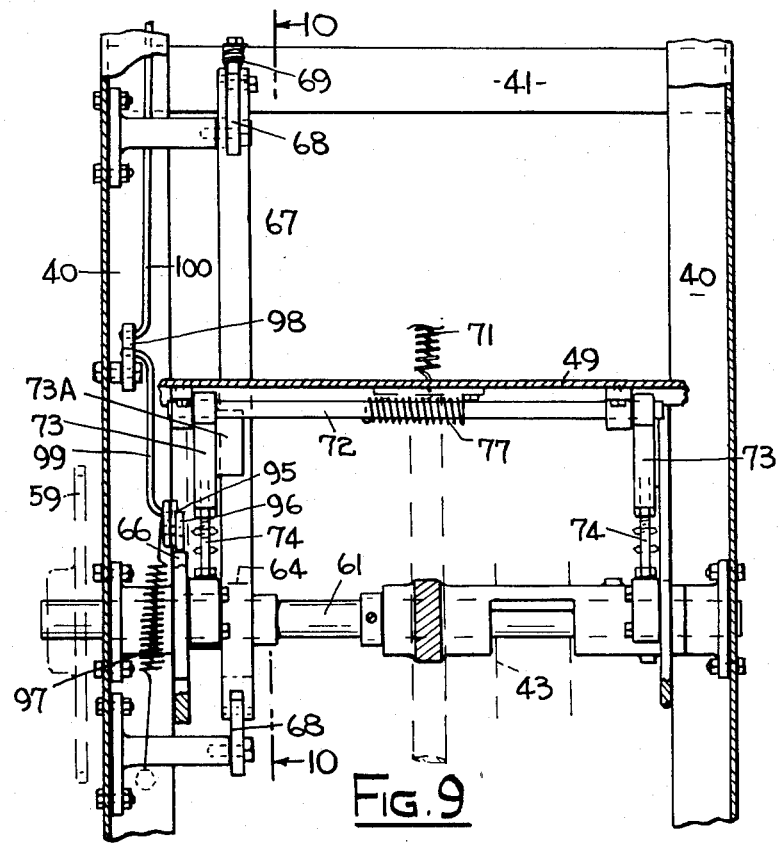
INVENTOR
E. H. T. BENSEMANN
By Young, Emery & Thompson
ATTYS.

Jan. 31, 1956  E. H. T. BENSEMANN  2,732,553
SELECTIVE NAIL FEED MECHANISM
Original Filed March 5, 1948  7 Sheets-Sheet 5
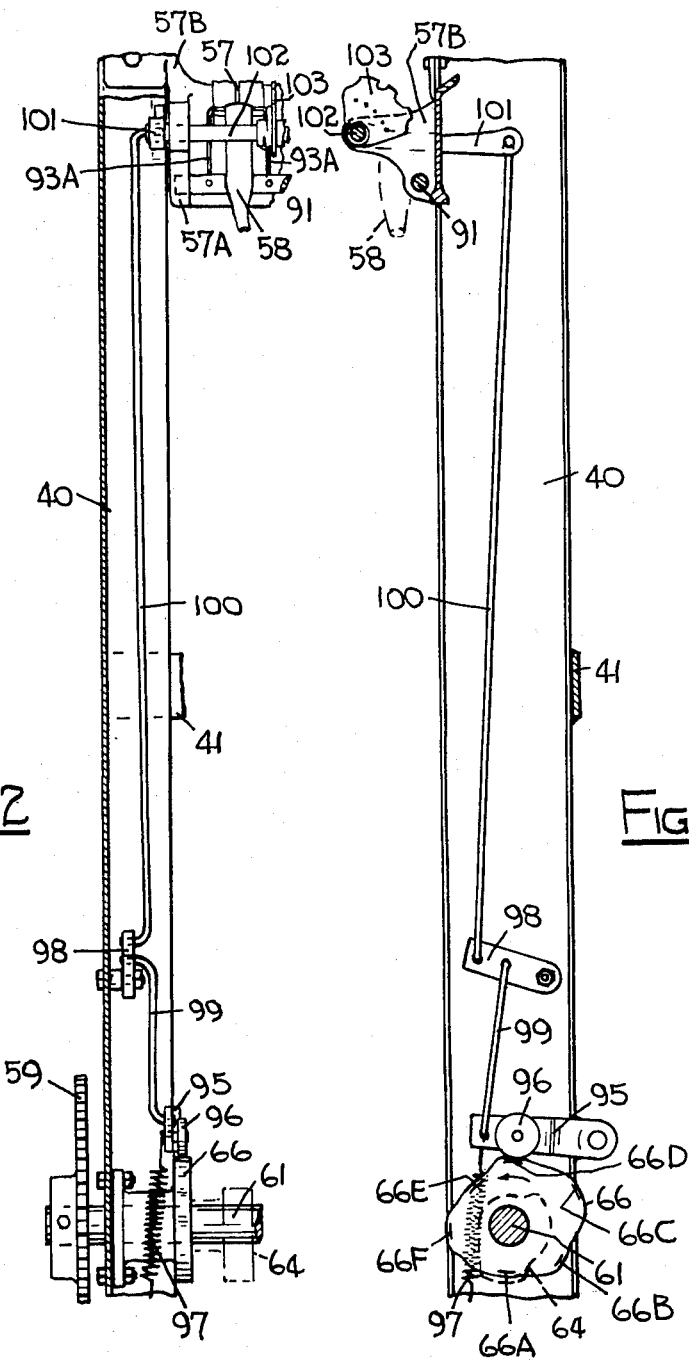
INVENTOR
E.H.T. BENSEMANN
BY Young, Emery & Thompson
ATTYS.

Jan. 31, 1956  E. H. T. BENSEMANN  2,732,553
SELECTIVE NAIL FEED MECHANISM
Original Filed March 5, 1948  7 Sheets-Sheet 6
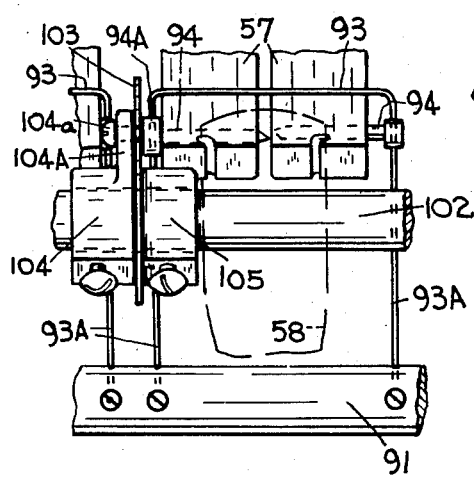
Fig.13
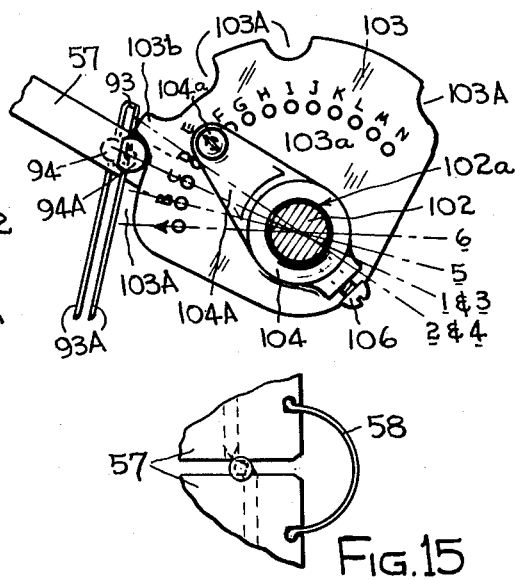
Fig.14
Fig.15
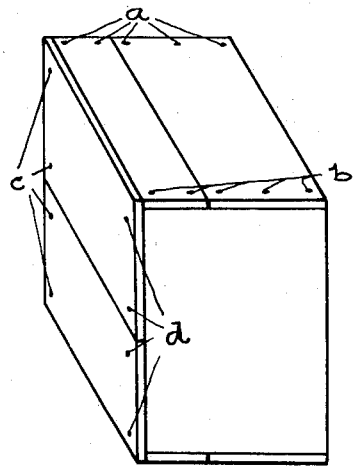
Fig.16
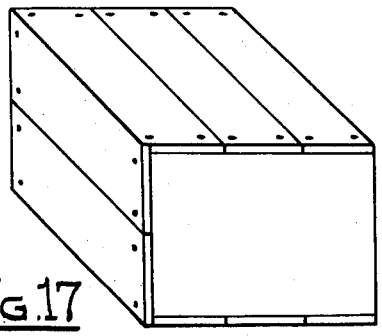
Fig.17
INVENTOR
E.H.T. BENSEMANN
By Young, Emery & Thompson
ATTYS.

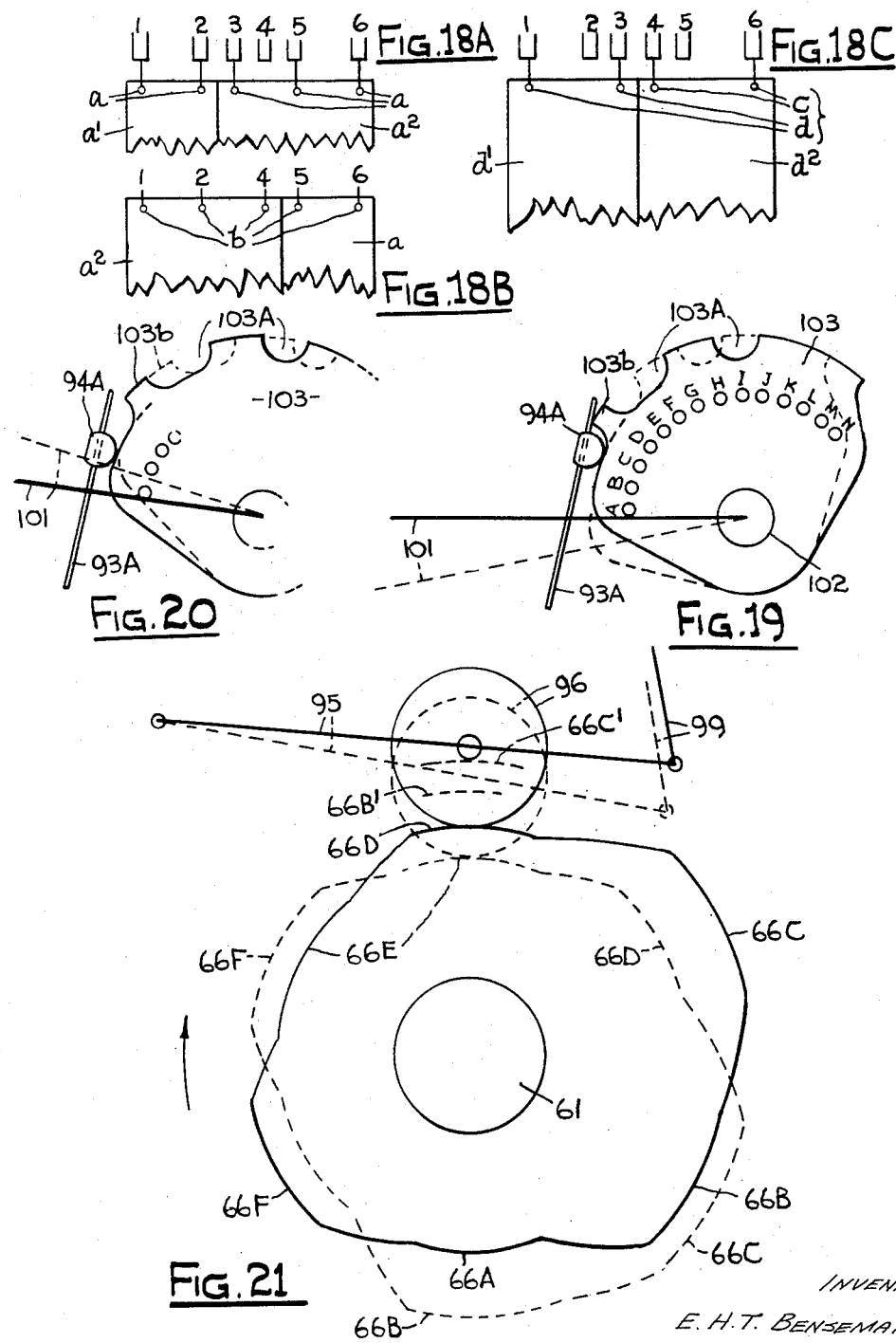

United States Patent Office

2,732,553
Patented Jan. 31, 1956

2,732,553

SELECTIVE NAIL FEED MECHANISM

Edward H. T. Bensemann, Wellington, Wellington, New Zealand, assignor to N. Z. Inventions Development Company Limited, Wellington, Wellington, New Zealand, a company of New Zealand Original application March 5, 1948, Serial No. 13,157. Divided and this application August 31, 1953, Serial No. 377,541

13 Claims. (Cl. 1—16)

This invention relates to improvements in machines adapted for use in the nailing of boxes of various sizes and types in a sequence or cycle of operations which permit of such boxes to be completed in one handling.

This application is a division of my co-pending parent application Serial Number 13,157, filed March 5, 1948.

The main object of my invention is, as different numbers and spacings of nails are often necessary for securing the portions of a box, the provision of means whereby the supply of nails may be regulated and/or selected in a positively timed relationship to movements of a box supporting table in the machine.

According hereto, an aspect of my invention is in a box nailing machine, nailing means, nail supplying feeds to the nailing means, driving means for actuating the nailing means, regulating means for the nail supplying feeds in which a rod is coupled to release pins disposed across the nail feeds whereby in each reciprocation of the rod the pins are caused to open and close the nail feeds in a time relationship to the nailing means.

In the following full description of the invention and its working, which description is made in relation to the accompanying drawings, the means regulating and selecting are described and shown by way of example as being concerned with a cycle of six operations and in combination with a table lifting adjusting means, of the kind described in my co-pending application No. 377,577 filed August 31, 1953.

Referring to the drawings:

Figure 5 shows on an enlarged scale, the nail regulating and selecting means;

Figure 6 is a plan view of one of the nail regulating and selecting means illustrated in the previous figure;

Figure 7 is a cross-sectional view, taken on the line 7—7 of Figure 5, of its means in one position;

Figure 8 is a similar view to Figure 7, but taken on the line 8—8 of Figure 5, with its means in another position;

Figure 9 is a detailed vertical sectional view, taken on line 9—9 of Figure 2, but on an enlarged scale, of certain exposed portions of the table adjustment means and nail selecting actuating means;

Fig. 11 is an enlarged view, taken on the line 11—11 of Figure 1, illustrating the arrangement of parts from a timing cam to an actuating spindle of the nail selecting means;

Figure 12 is a front view thereof, with the front web of a frame standard broken for purpose of clarity;

Figure 13 is a front view of one of the nail regulating and selecting means shown in Figure 5 but drawn to a larger scale;

Figure 14 is a right hand side view of Figure 13;

Figure 15 is a fragmentary plan view projected from Figure 14, showing a portion of the nail releasing mechanism;

Figure 16 is a view in oblique parallel projection of one box of certain dimensions and construction;

Figure 17 is a similar view to Figure 16, of another type of box of different dimensions and construction;

Figure 18A is a diagram showing the nailing of one end of one side of a box;

Figure 18B is a diagram showing the nailing of the other end of the same side of the box;

Figure 18C is a diagram showing the nailing of one end of the bottom of the box;

Figure 19 is a diagrammatic view showing two nail release positions of a selector plate;

Figure 20 is a diagrammatic view showing two other nail release positions, and

Figure 21 is a diagrammatic view showing different nail releasing positions of the timing cam mechanism.

Figures 1, 2:
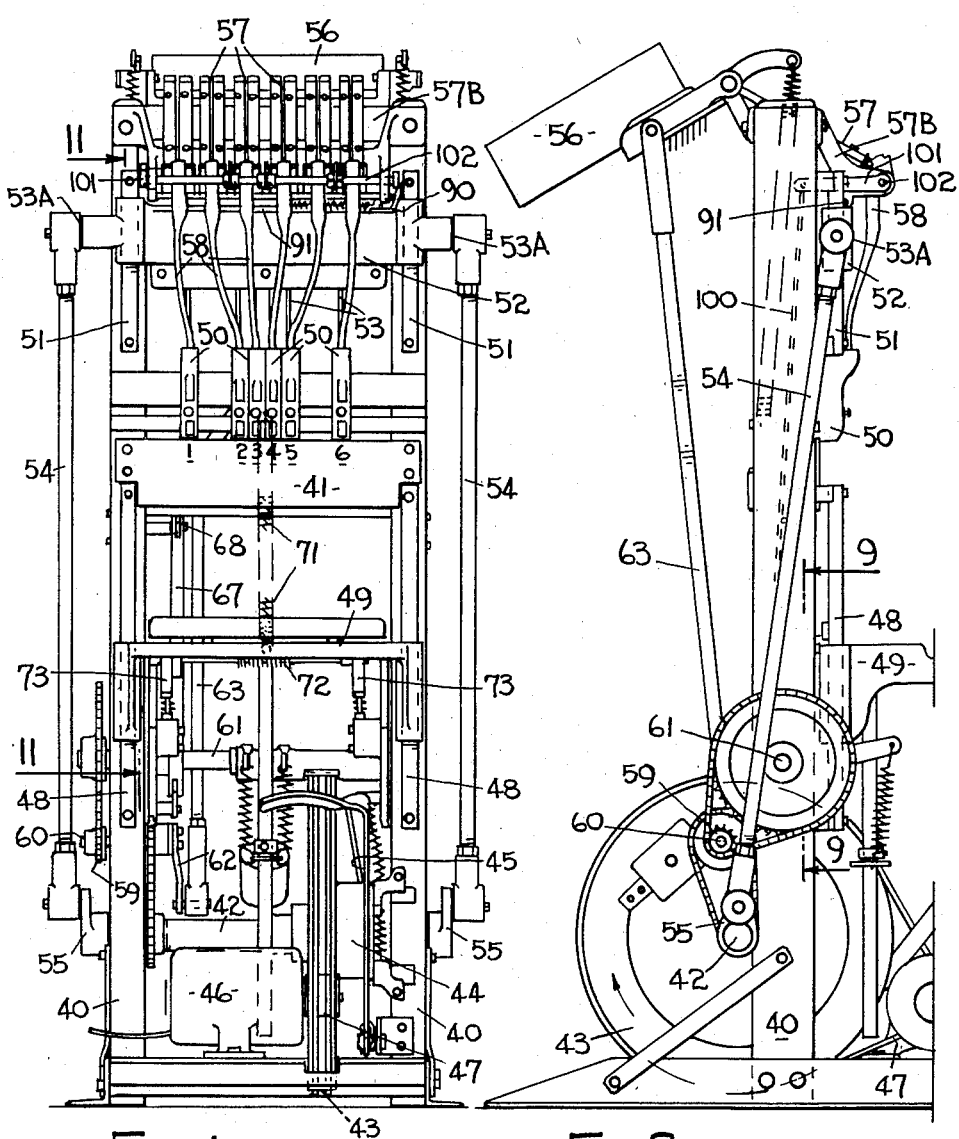
Figure 1 is a general front elevation of the complete machine.
Figure 2 is a left hand side elevation with certain unimportant parts omitted.

Referring to the main Figures 1 to 4 of the drawings, there is provided a vertical frame formed by two side standards 40, preferably of channel cross section arranged with their channels facing inwards to each other, which standards are fixed to base members and braced together by cross bars 41 positioned at certain positions in the height of the frame. A power shaft 42 is journalled to extend across the lower part of the frame and disposed on this shaft is a large flywheel 43 which is associated with a conventional sliding clutch mechanism 44 not detailed in the drawings, connected with a control lever 45 extending out from the front of the machine. An electric motor 46 is secured at the base of the frame and is connected to the flywheel 43 through a pulley and belt drives 47.

Extending up in front of each standard 40 (Figure 1) in the lower part of the frame is a guide rod 48, and on these two rods a work supporting table 49 is slidably mounted. Above the table and slidably affixed to two of the frame's cross bars 41 are a number of nailing chuck units 50. Also extending up in front of each standard 40, in the upper part of the frame, is a further guide rod or bar 51 and on these two bars a crosshead block 52 is slidably mounted; and slidably secured in the crosshead's lower side are a number of nail driving punches 53, one adapted to pass through each nail chuck unit 50. The crosshead 52 has a stub axle 53A extending out from each of its ends and on this is journalled an end of a long connecting rod 54, which rod extends down at a side of the frame for the other end of the rod to be journalled on the pin of a crank 55 attached to the respective ends of the power shaft 42.

A nail holding magazine or hopper 56 is carried upon the top of the frame by pivoting its forward edge thereto, and leading from this hopper are a number of inclined nail support guides 57. These guides are combined through feeding mechanisms to the ends of a number of funnels or chutes 58 which lead down into the nail chuck units 50. The foregoing features are known in respect of box nailing machines, but their inclusion is necessary for a working description of the invention appended in this specification.

Figure 3:
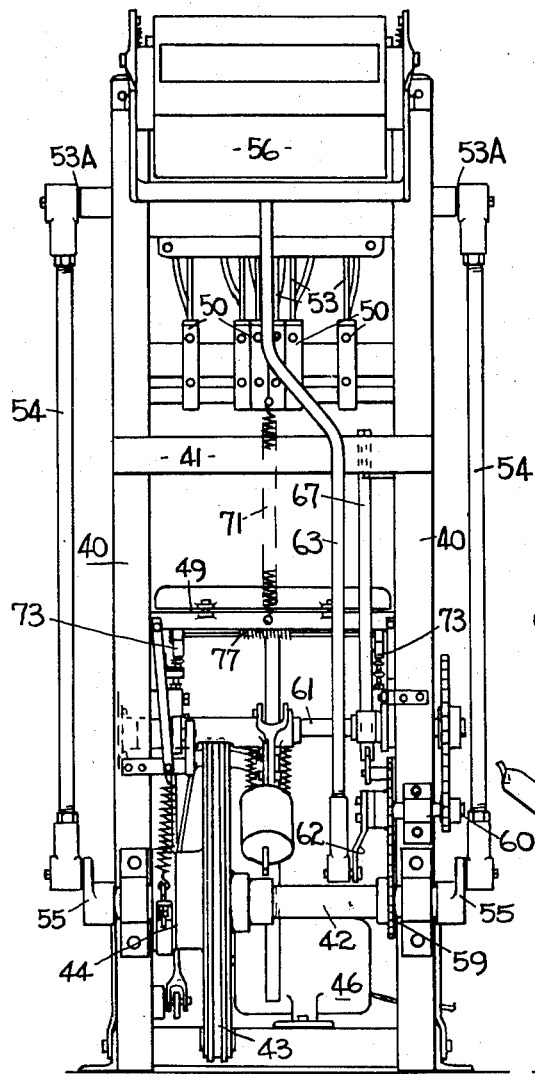
Figure 3 is a general rear elevation of the machine.
Figure 4:
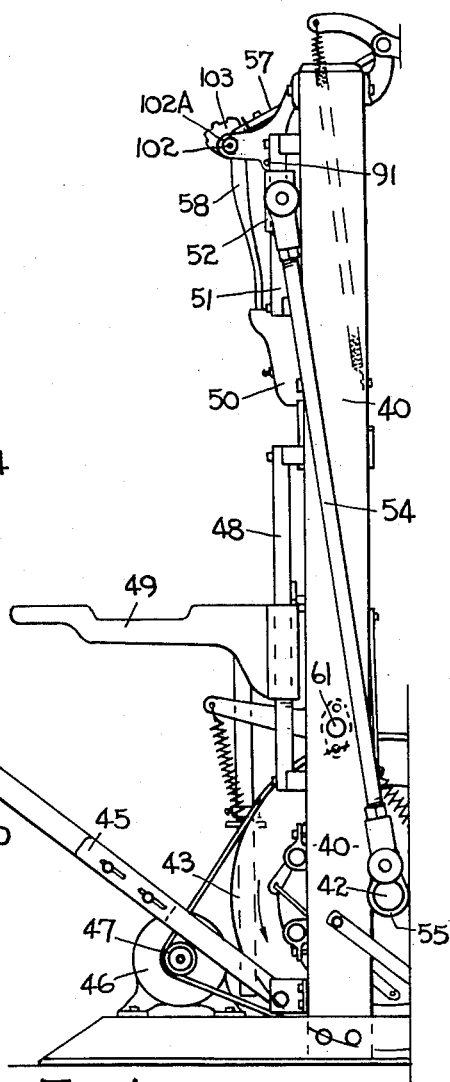
Figure 4 is a right hand, or reverse side, from that shown in Figure 2, and also omitting certain minor parts.

In this invention the power or drive shaft 42 is geared by suitable means, such as the chain and sprocket gearing 59, as shown in drawing Figures 1, 2 and 3, first with a short intermediate spindle 60 which is journalled upon the rear of one of the frame standards 40 and then to a countershaft 61 which is journalled to extend across between the two standards 40 at a suitable height beneath the work supporting table 49. This gearing 59 is so designed as to provide for transmission of rotation from the drive shaft 42 to the countershaft 61 whereby the latter may be turned through a definite proportion of a rotation for each full rotation of the drive shaft. This proportionate turning of the countershaft 61 is fixed to accord with the full number of operations to complete nailing of boxes concerned with the machine's operations, as, for instance, the six operations previously referred to in which the countershaft may be turned through one sixth of a rotation for each full rotation of the drive shaft 42. Therefore, the gearing between countershaft 61 and drive shaft 42 is in 6:1 ratio. The gearing between the intermediate spindle 60 and the drive shaft 42 is in 2:1 ratio.

The intermediate spindle 60 has fixed upon its inner end a crank arm 62 (Figure 3), and a connecting rod 63 leads from this arm up to be pivoted to the nail magazine or hopper 56.

Figure 10:
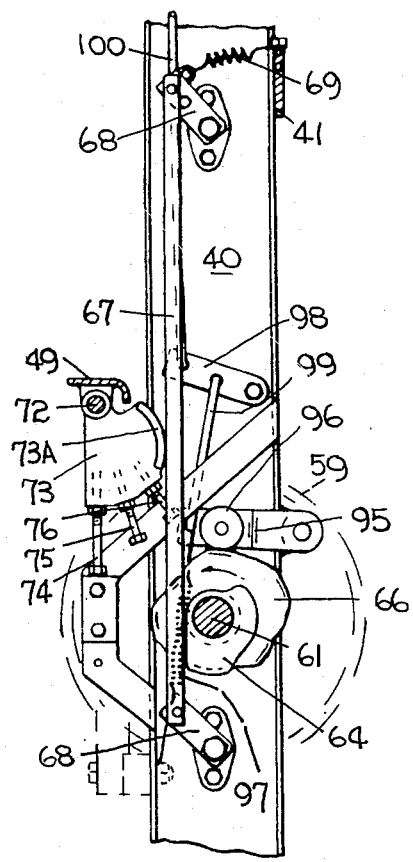
Figure 10 is a sectional side view, taken on the line 10—10 of Figure 9, of certain working mechanisms of the table adjustment means and the nail selecting means in one position.

Certain movements in the operation of the table 49 are governed by a table drop cam 64 (Figure 10) as described in my co-pending application No. 377,577. A nail feed selecting cam 66 (Figure 10) is disposed at one end of the countershaft 61 and is fixed to the shaft to be in a certain predetermined timing or relationship for the portion of the drive shaft with a nail feed regulating means.

The drop cam 64 operates a vertical bar 67 (Figure 10) which extends up within the standard 40 at that end of the shaft 61 so that the bar's relative side may engage the peripheral edge of the cam 64. This vertical bar is carried at each of its ends upon a crank arm 68 pivoted to the standard and is controlled by means of a tension spring 69 arranged between the top crank arm and the frame. This spring 69 is designed to cause the bar 67 to be forced rearwardly to maintain contact with the edge of the cam 64.

The table 49 mounted on its guide rods 48 has a tension spring 71 (Figure 1) extending centrally from its rear to a frame cross bar 41 and has a spindle 72 journalled to extend along upon its underside near its rear side (Figure 9). On each end of this spindle a quadrant device 73 (Figure 10) is fixed to extend radially downward and in the bottom edge of this quadrant three pins or legs 74, 75, 76, extend in radial lines from its spindle axis spaced one behind the other. These pins or legs are made to be of different lengths, and are screwed into the edge of the quadrant so that they may be adjustable as to their lengths. A helical spring 77 (Figure 9) surrounds the table spindle, being made fast between the table and the spindle and torsioned to normally turn the spindle 72 in a rearward direction. The quadrant device opposite the vertical bar 67 is provided with a shoulder 73A (Figure 10) for engaging the other side of the vertical bar 67 to that which engages the edge of the cam 64 on the countershaft 61. By means of the drop cam, bar 67 and quadrants 73 the table 49 can be supported on the blocks 74 in required positions below the nailing chucks, as described in my co-pending application No. 377,577.

The parts to provide for the regulated feeding of nails will now be described.

An inclined pusher finger 90 (Figures 1 and 5) is affixed to the cross-head 52 at one of its ends to extend upward towards the upper end of the fixed rod 51 on which the crosshead is adapted to slide. A rod 91 is mounted to extend across the front of the machine below the nail support guides 57, such rod at its two ends being slidably carried in guides 57A of a mounting bracket 57B upon the respective frame standards 40. A tension spring 92 arranged between the rod 91 and the appropriate bracket 57B has the influence to draw the rod 91 in one direction, to the right, Figure 5, for its respective end to engage the upward end of the pusher finger 90.

Affixed to the rod 91 in respect of each nail support guide 57 are two arms 93A (Figures 5 to 8) of an inverted U-shaped spring frame 93, which arms extend upward upon the respective sides of the support guides 57 to loop over it near the bottom of such guides. Secured to each arm 93A near its upper end is a pin 94 which projects laterally inward from the arm to pass into a hole bored through the adjacent flat bar of the guide for a full width thereof; the end of each pin is tapered. The frontal feed pin, as in Figures 13 and 14, is provided with a knob or head 94A through which the relative arm 93A of the U-spring passes. The two pins 94 and their holes are so disposed relatively, as particularly illustrated in such figures, that the pin on one side of the guide is a distance rearward of the pin of the other side slightly more than the diameter of nails which would be pendant one behind the other in the guide slot. The two pins also are made of such lengths that when one is moved across the slot in one movement the other will be clear thereof, as illustrated in drawing Figure 15.

The parts to provide for the selective control of the nail feeds will now be detailed.

The cam 66 affixed on the countershaft 61 is especially shaped in its peripheral edge with six equally spaced facings or lobes 66A–66F underlined as shown in drawing Figures 11 and 21. Each lobe being a timing or working part of the cam, its radial distance has been specially set in regard to selector plates as later described. A lever arm 95 is pivoted to the rear of the respective standard 40 at that side of the frame and on this lever at its inner side a roller 96 is mounted. This roller rests on the edge of the cam 66. The free end of the lever 95 has a tension spring 97 extending down to a suitable fixture beneath on the standard; this spring has the influence to draw down the lever arm to maintain the roller 96 engaging the cam's edge. A further lever arm 98 (Figures 11 and 12) is pivoted to the inside of this standard at a position above the first lever 95 and is attached thereto by a short rod 99 extending between the free end of the lower lever and medially in the upper lever. A long rod 100 leads upward from the free end of the second or upper lever 98 and is attached to the rear end of a crank arm 101; this crank arm projects forwardly in the upper locality of the machine. A spindle 102 is rotatively mounted to extend across at a distance in front of the nail support guides 57; the ends of this spindle are journalled in the respective brackets 57A on the frame's standards 40. This spindle 102 is maintained in the brackets by having its respective end beyond its bracket attached to the forward projecting end of the crank arm 101, whilst the spindle's other end has a collar 102A fixed outside of the other bracket.

On the spindle 102 are mounted a number of quadrantal plates 103, one for each nail support 57, which extends radially of the spindle and overlaps with its curved edge the headed front release pin 94A attached to one of the U-spring's arms 93A of such guide. These plates are mounted upon the spindle 102 that each may be turned independently and locked in any desired position. For this purpose each plate is located between collars 104, 105 (Figure 13) each of which is locked upon the spindle by set screws 106. One lock collar 104 is provided with an extension finger 104A.

Each quadrantal plate 103 is so formed around its edge with especially shaped notches or cutouts 103A positioned in such edge. Upon an arc having a radius from the centre of the spindle hole 102A in the plate and on equally spaced angles, is a set or number of holes 103A. Each hole is given an indicative reference letter "A"–"N," as illustrated in drawing Figure 14. The holes are also so arranged as to be in a definite relationship with the notches or cutouts 103A and the full portions in the edge of the plate; this will be readily understood by referring to the Figures 14, 19 and 20.

In the nailing machine described, on one rotation of the drive shaft 42 the cranks at its ends will, through the connecting rods 54, impart a down and up movement to the crosshead block 52. In the rising of the crosshead to its upward position and while it remains raised, the inclined pusher finger 90 will engage the end of the rod 91 (see Figure 5) and force it to slide in the frame brackets 57A away from the pusher finger and against the spring 92.

Thus, on each down and up movement of the crosshead, the rod 91 is caused to move in one direction under the influence of its spring 92 and is then pushed back in the opposite direction by pressure of the inclined finger 90. A full reciprocation of the rod 91 will thus take place on each operation of the machine.

When the rod 91 was moved by the pusher finger 90 through the arms 93A of the U-shaped spring frame 93, the rear pin 94 was caused to move across the width of the nail support guide 57 while the front headed pin 94A was drawn away from such guide thus releasing the end nail. When the crosshead 52 was lowered the rod 91 moved back in the direction under the influence of its spring 92, the positions of the pins 94, were reversed (Fig. 13), the rear pin 94 retired from the guide while the front pin moved across the guide. Thus, when the driver crosshead was in its upper rest position, nails in the support guide 57 of each chuck unit 50 were kept from sliding down to the chute 58 by the rear pin 94 extending across the slot. When the crosshead moved down the front pin moved across the slot while the rear pin retired, so that nails were held by the front pin. Thus, when the crosshead moves up again, the rear pin 94 moves in behind the front nail in the support guide 57 to divide it off from those behind, while the front pin retires to free such front nail so that it will fall point downward into the top of the chute 58. This chute leads it down into the relative nailing chuck unit 50 where the nail lodges beneath the raised end of a driving punch 53 of the crosshead 52.

During the downward movement of the crosshead 52 the driving punches 53 secured thereto acted to drive the nails previously fed to the chuck units 50. The pins 94 are carried on the U-shaped spring member 93 which gives resiliency to the pins so that, should a nail become caught against the points, only one support guide is affected, the rod 91 still being able to reciprocate to operate the releasing pins for the other guides.

Figures 19, 20 and 21 show the respective positions of the timing cam 66 and of a selector plate 103 during the six nailing strokes of the machine. The different positions assumed by the cam 66 and by the arm 101 during their movements are indicated by different types of lines.

It will be understood from Figures 11 and 12 that the arcuate movement of the free end of the arm 101 imparted to it by the arm 98 will be greater than the movement of the arm 95. The lever 95, rods 99 and arm 101 are indicated in the diagrams by single lines.

The movements of the cam 66 and the movements of a selector plate 103, having a setting which will permit the release of four nails during the six driving strokes, will be described. In Figure 21 the timing cam 66 on the countershaft 61 with its lobe 66D below the roller 96 are shown in full lines in the position they assume when the table 49 is in its intermediate position, that is, when it is supported by the intermediate legs 75 in readiness for nailing the first sides to the box, as described in my co-pending application No. 377,577.

The selector plate 103 is shown set on the spindle 102 so that the largest part of its cutaway portions 103A registers with the head 94A of the front pin 94 on the arm 93A of the U-shaped resilient spring member 93 so that, as the rod 91 (Figures 5 and 13) is reciprocated as described supra, the release of a nail by the pin 94 can take place upon the upward movement of the crosshead 52.

By the time the downward movement of the crosshead, that is, the first nailing stroke, is completed the countershaft 61 will have turned through the first one-sixth part of its full rotation and will have brought the cam 66 to the position shown by the dotted lines with its lobe 66E beneath the roller 96 which has dropped, and will have through the intervention of the lever 96 (Figures 11 and 12) and parts associated therewith brought the arm 101 and plate 103 to their second position, indicated by the dotted lines in Figure 19.

In this second position the uncut part 103A, of the plate 103 has moved opposite the head 94A of the releasing pin 94 so that, on the rising of the crosshead to again operate the nail control rod 91, a nail will not be released to its nail chute 58 for the following, i. e. the second nail driving stroke.

On the completion of such second driving stroke the cam 66 will, by reason of a further one-sixth rotation of the countershaft, have reached its third position; that is, the lobe 66F will have moved below the roller 96 and have raised the said roller back to its position in full lines since the radii of the lobes 66D and 66F are the same. This movement will cause the arm 101 to be raised, which will in turn rock the selector plate 103 back to a position the same as that of the first position (full lines) so that a nail will be released for the third driving stroke.

On the completion of this third driving stroke the cam 66 will have moved to its fourth position so that the lobe 66A will allow the roller to fall back to the position indicated by the dotted lines in Figure 21, since the radii of lobes 66A and 66E are the same.

The arm 101 will have thus been caused to return the plate 103 back to a position the same as that of its second position, where the uncut part 103A will again prevent the release of a nail for the fourth driving stroke.

In the fifth position, that is, the position of the cam at the end of the fourth driving stroke, the cam 66 has rotated so that its lobe 66B has reached the position indicated by the dotted lines 66B¹ in Figure 21 and has raised the roller 96, thereby causing the arm 101 to be raised and thereby rotate the plate 103 to the position shown in full lines in Figure 20, with the uncut part 103A clear of the head 94A, thus permitting the release of a nail to be driven on the fifth driving stroke.

In the sixth position of the cam, the lobe 66C will have reached the position indicated at 66C¹ in Figure 21 and will have raised the roller 96 still further, and consequently the arm 101 will be rocked to move the plate 103 to the position shown by the dotted lines in Figure 20, with the part 103A still further from the head 94A thereby permitting the release of a nail for the sixth driving stroke. This will complete the six positions of the cam 66 and selector plate 103 for the six driving strokes of the machine.

It will be seen that, with a selector plate set in relation to the head 94A as above described, a nail will only be released for the 1st, 3rd, 5th and 6th strokes.

If the plate 103 is set so that an uncut portion of its edge will oppose the head 94A during all movements of the arm 101 then no nails will be delivered to the nail chutes, but if the plate is set so that the uncut portions are at each movement clear of the head 94A then a nail will be released for each driving stroke. It will be seen that, by means of the shape of the cutaway edges of the plates, many different sequences of nail release for each chute may be obtained according to the position of the plate to the head 94A. With a setting as shown in Figure 14 a different nailing sequence could be obtained.

The plates as described supra are held in a selected set position on the shaft 102 by inserting the locating pin 104A (Figures 13 and 14) of the extension finger 104A into the appropriate hole 103A. For the setting of the plate on the shaft 102 as shown in Figures 19 and 20 the locating pin would be inserted into the hole marked "B." Such an arrangement of "locating holes" and their marking enables a table to be prepared which will enable an operator to know immediately the setting required for a given nailing sequence throughout the six strokes for one nailing chuck. On such a table the nailing sequence for one punch with a setting of the plate as in Figures 19 and 20 would appear as follows for the six strokes:

Stroke:                                             B
  1 _____ 1
  2 _____ 0
  3 _____ 1
  4 _____ 0
  5 _____ 1
  6 _____ 1

The numbers appearing under the heading "B" indicates the release or not of a nail for the strokes under the heading "stroke."

The selector plate can conveniently be called numbers 1 to 6 corresponding to the number of the chucks.

In the case of nailing the box shown in Figure 16, the setting for the six chucks will be as follows:

Chuck punches:                                Locking hole
  1 _____ "A"
  2 _____ "M"
  3 _____ "B"
  4 _____ "C"
  5 _____ "M"
  6 _____ "A"

For this setting a nail would be delivered to chucks 1, 2, 3, 5 and 6, but a nail would not be released to number 4 chuck. Upon the box being turned end to end the nails would be driven by punches 1, 2, 4, 5 and 6. This arrangement is selected because one of the side boards a1 (Figures 16 and 18A) of the box shown is narrower than the other a2 and will receive two nails and the wider board a2 three nails, being five nails referenced "a," but when the box is turned end to end the position of the boards will be reversed as indicated at B, Figure 18. On the third nailing, however, the box has been turned over, the same nailing being required for the other side so that the third and fourth nailings will correspond to the first and second, these five nails being referenced "b." Nailing the bottom boards d1 and d2 of the box requires four nails, referenced "c" and "d" respectively, at each end so that numbers 1, 3, 4 and 6 selector plates release nails to the respective chutes 58 during these two strokes, but the selector plates for numbers 2 and 5 are set to prevent the release of nails, so that nails are driven by the punches 1, 3, 4 and 6 as indicated in Figure 18C.

With the making of the box as shown, the first and second nailing is when the table is supported on the intermediate legs, but the third and fourth nailings are when the table is supported on the short legs and the final fifth and sixth nailings for the bottom of the box are when the table is supported on the longest legs.

In drawing Figure 17 a box of deep and narrow shape is illustrated, instead of the broad and shallow shape illustrated in Figure 16.

The functions of the machine also apply to this type of box (Figure 17), except that making up would normally commence at the stroke immediately after the table had been lifted to its highest level. By so doing, however, the nailing sequence in relation to the nailing on of the sides would be altered so that the timing cam 66 would require to be advanced two-sixths of a turn on the countershaft 61, means for which would be provided.

Depending upon the ratio of the train gearing 59 between the drive shaft 42 and the countershaft 61 this determines the number of nailing strokes per cycle of operations. In the description and drawings presented six strokes are provided for, four for nailing the sides of the box and two for nailing the bottoms. If the edges of the timber or boards forming the bottom and lid of the box being made up would be required to be nailed a cycle of eight operating strokes would be necessary. Other projects would require a lesser or a greater number of strokes per cycle of operations, so that the ratio of gearing is not limited to any particular order, or the number of shoulders or lobes on the feed cam 66 limited to any given number nor to the number of adjustable support legs of the table 49.

The positioning of the selector plates 103 at specific positions along their actuating spindle 102 provides by their specially shaped curved edge for an intermittent feed to be set for certain nailing chucks for different nailing at various positions around a box. Also, by the radial adjustment of the plates, many different combinations of feed may be obtained.

Having now described my invention what I claim is:

1. Nail feed mechanism for a nailing machine, nail selector mechanism comprising nail support guides having slots for the nails, nail releasing means including a nail holding pin and a releasing pin traversing the slots of said support guides, a movable member by which said pins are carried, means actuated by nail driving mechanism of the machine to reciprocate said member to effect the reciprocal movement of the pins and thereby the entry and withdrawal of each of said pins alternately to each other, said releasing pin being resiliently mounted on said member to have resiliency in the direction of its movement, and nail selector means actuated by the nail driving mechanism and co-operating with said nail releasing means for the release or non-release of a nail for any predetermined nail driving stroke.

2. Nail feed mechanism as claimed in claim 1, wherein a spring member is mounted on said movable member and carries at its upper end the releasing pin.

3. Nail feed mechanism as claimed in claim 1, wherein a U-shaped spring member is mounted in said movable member and resiliently supports said holding pin and the releasing pin.

4. In a nailing machine mechanism comprising nailing means, actuating means for the nailing means, nail support guides for supplying nails to the nailing means, nail releasing means reciprocated by the actuating means for the nailing means to open and close said nail support guides, nail selector mechanism co-operating with said releasing means, selector members included in said selector mechanism for setting to selected positions in relation to the releasing means, and means operable by said actuating means for the nailing means to impart to said selector members an arcuate movement transversely to the movement of the releasing means, said members being formed so that in a selected set position in relation to the releasing means they will at each arcuate movement be moved to a position to prevent or permit the release of a nail.

5. In a nailing machine as claimed in claim 4, wherein the said selector members are formed with a series of cutaway portions so that during its arcuate movements, when a cutaway portion registers with the releasing means, the release of a nail to the nailing means is permitted.

6. In a nailing machine as claimed in claim 4, wherein the said selector members are in the form of a quadrant-like plate having a number of cutaway portions on its periphery so that, when a cutaway portion registers with its releasing means, the release of a nail to the nailing means is permitted, and when an uncut portion registers with the said releasing means the release of a nail is prevented.

7. In a nailing machine as claimed in claim 4, wherein a member is included in the releasing means and reciprocated by the actuating means for the nailing, a releasing pin included as a part of the nail releasing means and mounted on said member so that during the reciprocation of the releasing means said pin will move into the path of the selector members.

8. In a nailing machine as claimed in claim 4, wherein an actuating spindle has the said members adjustably mounted thereon, an arm connected to said spindle, a cam having a number of lobes and operable by the actuating means for the nailing means, and means operable by said cam connected to said arm.

9. In a box nailing machine, nail driving means, a series of nail support guides open at one end for delivery of nails to the nail driving means, actuating means for the nail driving means, releasing means for each nail support guides comprising a number of release pins disposed to cross the nail path of the nail support guides one behind another and to enter from the respective sides of the said nail guides, a rod included in the said releasing means to which each of said pins is resiliently coupled and which is disposed beyond the open end of the nail support guides and means actuated by said nail driving means to reciprocate said rod.

10. In a box nailing machine, nailing units having driving punches, driving means to actuate the nail driving punches in a downward and upward movement, nail support guides having an open end designed to supply nails to respective nailing units, nail releasing means for each nail support guide comprising release pins disposed one behind the other through the nail support guide, a spring on which the release pins for each nail support guide are carried and a rod disposed beyond the open end of the nail support guides and carrying said springs which extend radially outwards from said rod and upwards over the nail support guides, means to reciprocate said rod from the said driving means whereby the movement of the rod in one direction will cause one release pin to project across the nail support guide and the other pin to be withdrawn and the movement of the rod in the other direction will reverse the position of the said pins, and selector mechanism actuable by the driving means in a time relationship to the nail driving punches to provide for the release or non-release of a nail from a nail support guide for any predetermined nail driving strokes.

11. In a box nailing machine as claimed in claim 10, wherein the said selector mechanism comprises a spindle disposed beyond the open ends of the nail support guides, a quadrant plate for each nail support guide formed along its curved edge with arranged notches or breaks and adjustably mounted on the spindle whereby the curved edge may overlap a release pin in the said nail support guide, a timing member actuated by the driving means whereby said member is actuated through a partial movement to a downward and upward movement of the nail driving punches, and connecting means between the timing member and the said spindle whereby the latter and its quadrant plates may be turned to selected positions in relation to the release pins on the partial movement of the timing member.

12. In a box nailing machine as claimed in claim 10, wherein the said spring consists of a U-spring frame attached along the rod for each nail support guide and having its arms extending upwards on respective sides thereof, a release pin carried on each arm and passing through the nail support guide so that the pins are one behind the other, whereby in the movement of the rod in one direction will cause one pin to project across the nail support guide and the other to be withdrawn therefrom, and the movement in the other direction will reverse these positions, and means whereby selected release pins may be rendered operative and others inoperative on predetermined operations of the nail driving punches.

13. In a box nailing machine according to claim 10, means for rendering the said nail releasing means of the respective nail support guides selectively operative at predetermined operations of the nail driving punches, said means comprising a spindle disposed to extend above the said reciprocating rod, a quadrant plate for each nail support guide formed along its curved edge with arranged notches or breaks and adjustably mounted on the spindle whereby the curved edge may overlap a release pin in the nail support guide and, when a notch is opposite such pin, the quadrants will permit of said pins moving with the rod, means for locking each quadrant to the spindle at any desired point and predetermined setting, a countershaft journalled in the machine and operable by the driving shaft of the machine, driving means between the driving shaft and the countershaft whereby for each full rotation of the driving shaft the countershaft will be turned through a rotation corresponding to a complete nailing operation of the machine, a cam disc mounted on such countershaft, and means actuated by such cam disc whereby the said spindle may be turned to varying selected positions on the movements imparted to the countershaft.

References Cited in the file of this patent

UNITED STATES PATENTS

| Number | Name | Date |
|---|---|---|
| 221,844 | Messer | Nov. 18, 1879 |
| 403,843 | Junkins | May 21, 1889 |
| 515,393 | Atwood | Feb. 17, 1894 |
| 2,175,482 | Paxton | Oct. 10, 1937 |
| 2,195,421 | McLeod | Apr. 2, 1940 |